US012613981B2

(12) United States Patent
Biswas

(10) Patent No.: US 12,613,981 B2
(45) Date of Patent: Apr. 28, 2026

(54) PROVIDING ENCRYPTED END-TO-END EMAIL DELIVERY BETWEEN SECURE EMAIL CLUSTERS

(71) Applicant: CA, Inc., San Jose, CA (US)

(72) Inventor: Dhrubojyoti Biswas, Waterloo (CA)

(73) Assignee: CA, Inc., San Jose, CA (US)

( * ) Notice: Subject to any disclaimer, the term of this patent is extended or adjusted under 35 U.S.C. 154(b) by 289 days.

(21) Appl. No.: 18/465,285

(22) Filed: Sep. 12, 2023

(65) Prior Publication Data

US 2025/0086292 A1 Mar. 13, 2025

(51) Int. Cl.
*G06F 21/60* (2013.01)
*H04L 51/48* (2022.01)

(52) U.S. Cl.
CPC ............ *G06F 21/602* (2013.01); *H04L 51/48* (2022.05)

(58) Field of Classification Search
CPC ..... G06F 21/602; G06F 21/606; H04L 51/48; H04L 51/42; H04L 63/0428; H04L 63/02; H04L 63/083
See application file for complete search history.

(56) References Cited

U.S. PATENT DOCUMENTS

| | | | | |
|---|---|---|---|---|
| 7,634,809 | B1 * | 12/2009 | Schneider ........... | H04L 63/1416 726/22 |
| 2005/0039019 | A1 * | 2/2005 | Delany ................. | H04L 63/126 713/176 |
| 2006/0200523 | A1 * | 9/2006 | Tokuda ................... | H04L 51/48 709/206 |
| 2006/0200531 | A1 * | 9/2006 | Tokuda ................. | H04L 51/224 709/206 |
| 2007/0011253 | A1 * | 1/2007 | Taylor ................... | H04L 51/48 709/206 |
| 2007/0083749 | A1 * | 4/2007 | Fang .................. | H04L 63/0823 713/152 |
| 2009/0234845 | A1 * | 9/2009 | DeSantis ............... | H04L 43/026 707/999.005 |
| 2014/0153489 | A1 * | 6/2014 | Perras .................. | H04W 60/00 370/328 |
| 2017/0012943 | A1 * | 1/2017 | Kaliski, Jr. ......... | H04L 63/0428 |
| 2021/0006581 | A1 * | 1/2021 | Gladstone ........... | H04L 63/1416 |
| 2024/0388605 | A1 * | 11/2024 | Swaminathan ......... | H04L 51/48 |

* cited by examiner

*Primary Examiner* — Richard G Keehn
(74) *Attorney, Agent, or Firm* — Foley & Lardner LLP

(57) ABSTRACT

The systems and methods described provide a seamless end-to-end email delivery between secure email clusters without reliance on prior sharing of encryption keys or protocol configurations. The solution can receive a request to transmit an email to a recipient identified by a domain of the recipient. The solution can transmit a first query to a domain name service (DNS) to fetch one or more records corresponding to the domain of the recipient. The one or more records can identify a key service. The solution can receive, from the key service responsive to a second query to the key service, a key for encrypting the email. The solution can encrypt at least a portion of the email based at least on the key and transmit the encrypted email to the recipient.

19 Claims, 4 Drawing Sheets

400

PROVIDING ENCRYPTED END-TO-END EMAIL DELIVERY BETWEEN SECURE EMAIL CLUSTERS

TECHNICAL FIELD

This disclosure generally relates to systems and methods of providing secure end-to-end email delivery, including without limitation, end-to-end delivery of seamlessly encrypted emails.

BACKGROUND

Enterprises, such as corporations, organizations or entities, can support email systems for providing their users with email services. These systems can include diverse architectures, configurations, settings and protocols, depending on preference and design. Email delivery between different enterprises may involve utilizing varying email infrastructures that can collaborate to deliver services to the users.

SUMMARY

Securely sending emails from a sender to a recipient can be a challenge. Emails, unlike other messaging solutions, can route messages across email servers, such as simple mail transfer protocol (SMTP) servers or mail transport agents (MTAs). SMTP and MTAs can, in turn, communicate with each other across the network and different enterprise domains. To provide a secure email communication between a sender and one or more recipients, systems can share user-generated encryption keys prior to the email exchange. Systems can also tie the encryption/decryption processes with the email client presuming that the sender and recipient have already exchanged encryption keys. Systems can further generate a symmetric key from the sender's inbox password and then send a link to the recipient to allow recipient's access to the symmetric key for decryption. However, any of these approaches entail taking additional steps to either pre-exchange the encryption keys or pre-negotiation of encryption or decryption protocols, which can introduce challenges and inefficiencies.

The present solution overcomes these challenges by making the encryption/decryption process seamless to the end users, completing the secure email exchange without any steps of the user for encrypting or decrypting the email. For example, the present solution provides a seamless end-to-end email delivery between secure email clusters of enterprises without reliance on prior sharing of encryption keys or protocol configurations.

At least one aspect is directed to a method. The method can include a mail transport agent (MTA) of a sender receiving a request to transmit an email to a recipient. The recipient can be identified by a domain of the recipient. The method can include the MTA of the sender transmitting a first query to a domain name service (DNS) to fetch one or more records corresponding to the domain of the recipient. The one or more records can identify a key service. The method can include the MTA receiving, from the key service responsive to a second query to the key service, a key for encrypting the email. The method can include one of the sender or the MTA encrypting at least a portion of the email based at least on the key. The method can include transmitting the encrypted email to the recipient.

The method can include the MTA of the sender intercepting a RCPT_TO command for the email. The intercepted RCPT_TO command can be configured to transmit the first query to the DNS and the second query to the key service. The method can include a record of the one or more records that can include at least one of: a time-to-live (TTL) value, a class of the record, a type of the record, a priority of the recipient, a weight of the recipient and a port identifier.

The method can include the MTA receiving from the DNS, responsive to the first query, a first record of the one or more records identifying the key service. The MTA can receive, responsive to the first query, a second record of the one or more records identifying a provisioning service. The method can include identifying, by the MTA, a configuration for encrypting the email by the sender. The MTA can transmit, responsive to the configuration, the second query to the key service requesting the key.

The method can include the MTA identifying a configuration for encrypting the email by the sender and decrypting the email by the recipient using the key. The method can include the sender generating, responsive to the configuration, the key for a session between the sender and the recipient. The method can include the MTA identifying a configuration for caching the key. The MTA can cache, responsive to the configuration for caching the key, the key on a cache server.

The method can include determining, according to a configuration of a provisioning service, that a location for encrypting the email is one of the sender or the MTA and encrypting, by the one of the sender or the MTA responsive to the determined location, the at least the portion of the email by one of the sender or the MTA. The method can include determining, based on a configuration of a provisioning service, that a hash value is to be included in the email. The MTA can insert, responsive to the configuration, the hash value in a header of the email to be transmitted.

The method can include the DNS of the sender that is configured to receive from a second DNS of the recipient a first record of the one or more records corresponding to the domain of the recipient and transmit to the second DNS a second record of the one or more records corresponding to a second domain of the sender.

At least one aspect is directed to a system. The system can include at least one processor coupled with memory. The at least one processor can be configured to receive a request to transmit an email to a recipient identified by a domain of the recipient. The at least one processor can be configured to transmit a first query to a domain name service (DNS) to fetch one or more records corresponding to the domain of the recipient, the one or more records identifying a key service. The at least one processor can be configured to receive, from the key service responsive to a second query to the key service, a key for encrypting the email. The at least one processor can be configured to encrypt at least a portion of the email based at least on the key. The at least one processor can be configured to transmit the encrypted email to the recipient.

The system can include the at least one processor configured to intercept a RCPT_TO command for the email. The intercepted RCPT_TO command can be configured to transmit the first query to the DNS and the second query to the key service. The one or more records can include at least one of: a time-to-live (TTL) value, a class of the record, a type of the record, a priority of the recipient, a weight of the recipient and a port identifier.

The system can include the least one processor configured to receive, from the DNS responsive to the first query, a first record of the one or more records identifying the key service. The at least one processor can receive, responsive to the first query, a second record of the one or more records identifying a provisioning service. The system can include the at least one processor configured to identify a configuration for encrypting the email by a sender of the email and transmit, responsive to the configuration, the second query to the key service requesting the key.

The system can include the at least one processor configured to identify a configuration for encrypting the email by a sender of the email and decrypting the email by the recipient using the key. The at least one processor can be configured to generate, responsive to the configuration, the key for a session between the sender and the recipient. The at least one processor can be configured to identify a configuration for caching the key and cache, responsive to the configuration, the key on a cache server.

The system can include the at least one processor configured to determine, according to a configuration of a provisioning service, that a location for encrypting the email is one of the sender or the MTA. The at least one processor can be configured to encrypt, by one of a sender of the email or a mail transport agent (MTA) responsive to the determined location, the at least the portion of the email by one of the sender or the MTA. The at least one processor can be configured to determine, based on a configuration of a provisioning service, that a hash value is to be included into the email and insert, responsive to the configuration, the hash value in a header of the email to be transmitted.

At least one aspect is directed to a non-transitory computer-readable medium storing instructions that, when executed by at least one processor of a service, cause the at least one processor to receive a request to transmit an email to a recipient identified by a domain of the recipient. The instructions, when executed, can cause the at least one processor to transmit a first query to a domain name service (DNS) to fetch one or more records corresponding to the domain of the recipient. The one or more records can identify a key service. The instructions, when executed, can cause the at least one processor to receive, from the key service responsive to a second query to the key service, a key for encrypting the email. The instructions, when executed, can cause the at least one processor to encrypt at least a portion of the email based at least on the key. The instructions, when executed, can cause the at least one processor to transmit the encrypted email to the recipient.

BRIEF DESCRIPTION OF THE DRAWINGS

These and other aspects and features of the present embodiments will become apparent to those ordinarily skilled in the art upon review of the following description of specific embodiments in conjunction with the accompanying figures.

DETAILED DESCRIPTION

Figure 1:
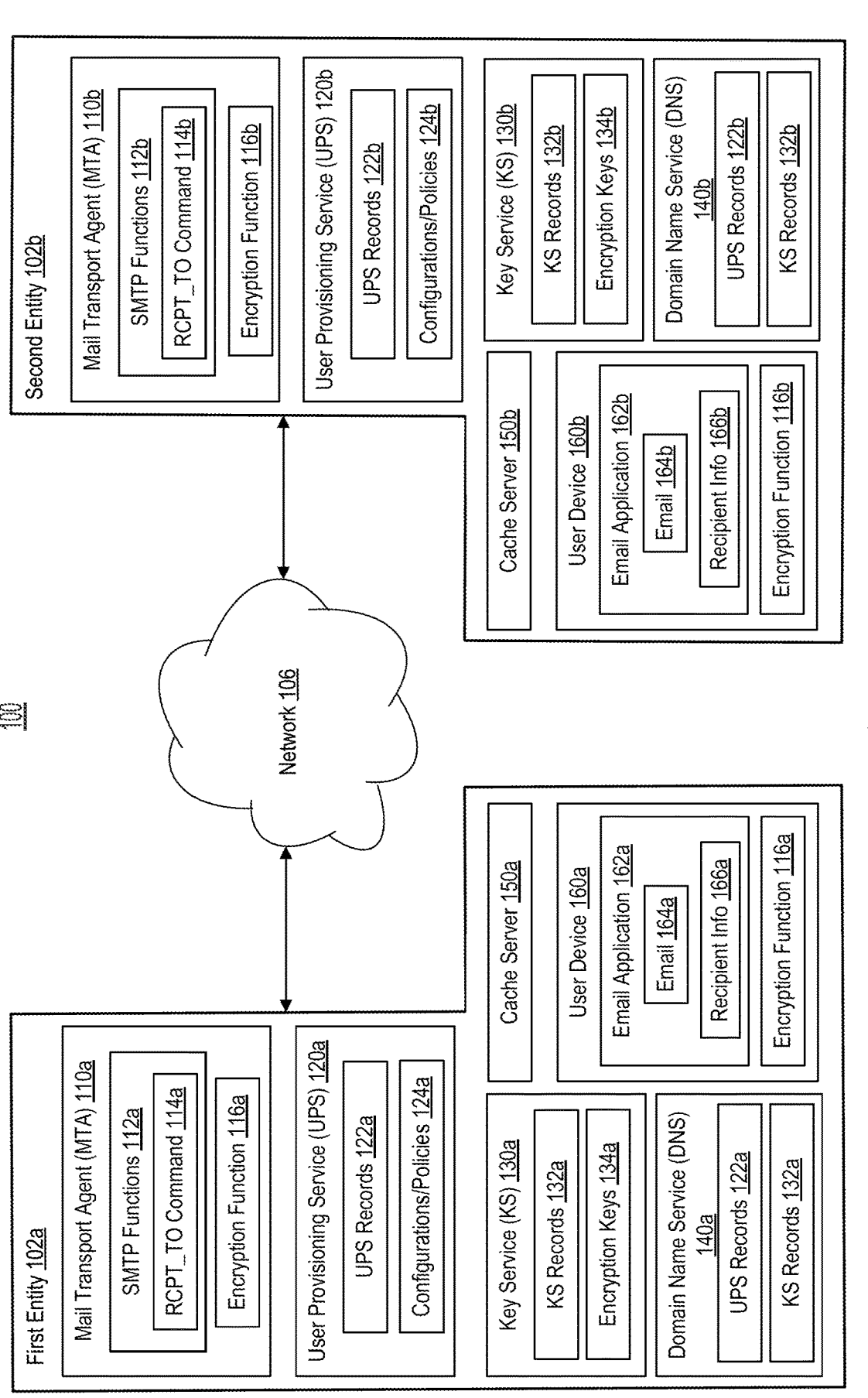
FIG. 1 is a block diagram of a system for providing seamless end-to-end email delivery across secure email clusters without prior key sharing or protocol configurations.

The present embodiments shall now be described in detail with reference to the drawings, which are provided as illustrative examples of the embodiments so as to enable those skilled in the art to practice the embodiments and alternatives apparent to those skilled in the art. Figures and examples below are not meant to limit the scope of the present embodiments to a single embodiment, but other embodiments are possible by way of interchange of some or all of the described or illustrated elements, or those apparent to a person of ordinary skill in the art. Certain elements of the present embodiments can be partially or fully implemented using known components, only those portions of such known components that are necessary for an understanding of the present embodiments shall be described, and detailed descriptions of other portions of such known components will be omitted so as not to obscure the present embodiments. Embodiments described in their illustrated contexts should not be limited thereto. For example, embodiments described as being implemented in software should not be limited to such implementation alone, but they can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Providing secure email transmission between enterprises can be a challenge. Since various enterprises can include customized or personalized email systems (e.g., personalized servers, policies or configurations or encryption/decryption techniques) it can be challenging to exchange emails across such different enterprise domains. To provide a secure client communication, different email system can share user-generated encryption keys prior to the email exchange. Sometimes, the email systems can rely on the email client to resolve the encryption/decryption processes by assuming that the sender and recipient had already exchanged encryption keys. Sometimes, the email systems can generate a symmetric key from the sender's inbox password and then send a link to the recipient to allow recipient's access to the symmetric key for decryption. However, these approaches each utilize either pre-exchange of the encryption keys or pre-negotiation of encryption or decryption protocols, which can be challenging under certain conditions and can introduce system inefficiencies.

The present solution overcomes these challenges by providing a seamless end-to-end email delivery between secure email clusters of different enterprises without relying on prior sharing of encryption keys or prior protocol configurations.

FIG. 1 illustrates an example system 100 for providing seamless end-to-end email delivery across secure email clusters without prior key sharing or protocol configurations. System 100 can include a first entity 102*a* (e.g., an enterprise secure email cluster of a sender) communicating over a network 106 with a second entity 102*b* (e.g., an enterprise secure email cluster of a recipient). Each of the first entity 102*a* and the second entity 102*b* can include one or more mail transport agents (MTAs) 110*a* or 110*b*, user provisioning services (UPSs) 120*a* or 120*b*, key services (KSs) 130*a* or 130*b*, domain name services (DNSs) 140*a* or 140*b*, cache servers 150*a* or 150*b* and user devices 160*a* or 160*b*.

In example system 100, a first entity 102*a* can include an MTA 110*a*, a UPS 120*a*, a key service (KS) 130*a*, a DNS 140*a*, a cache server 150*a* and user device 160*a*. MTA 110*a* an include can include one or more encryption functions 116*a* and SMTP functions 112*a* that can include one or more RCPT_TO commands or hooks 114*a*. Each UPS 120*a* can include one or more UPS records 122*a* and configurations (e.g., policies) 124*a*. Each KS 130*a* can include one or more KS records 132*a* and encryption keys 134*a*. Each DNS 140*a* can include one or more UPS records 122*a* and KS records 132*a*. Each user device 160*a* can include one or more encryption functions 116*a* and email applications 162*a* for generating emails 164*a* using recipient information 166*a*. Similarly, a second entity 102*b* can include an MTA 110*b*, a UPS 120*b*, a key service (KS) 130*b*, a DNS 140*b*, a cache server 150*b* and user device 160*b*. MTA 110*a* an include can include one or more encryption functions 116*b* and SMTP functions 112*b* that can include one or more RCPT_TO commands or hooks 114*b*. Each UPS 120*b* can include one or more UPS records 122*b* and configurations (e.g., policies) 124*b*. Each KS 130*b* can include one or more KS records 132*b* and encryption keys 134*b*. Each DNS 140*b* can include one or more UPS records 122*b* and KS records 132*b*. Each user device 160*b* can include one or more encryption functions 116*b* and email applications 162*b* for generating emails 164*b* using recipient information 166*b*. The generated emails 164 (e.g., 164*a* or 164*b*) can be transmitted across the network 106 between the first entity 102*a* and the second entity 102*b*. The system 100 can include features or components, such as those discussed in Request for Comments (RFC) 5322 and RFC 2822 directed to Internet Message Format, both of which are incorporated herein by reference in their entirety, and for all purposes.

The entities 102, including the first entity 102*a* and the second entity 102*b*, can include any group or collection of interconnected servers and/or services for providing secure and reliable email communication, such as a secure email cluster. An entity 102 can include an organization's network or system for facilitating email services. Entities 102 can include components such as Mail Transfer Agents 110, also referred to as a Mail Transport Agent 110, (e.g., SMTP servers or services), User Provisioning Services (UPS) 120, Query Public Key (QPK) 130 systems, and Domain Name Systems (DNS) 140 that can work together to provide confidentiality, integrity, and availability of email messages. Certain data, such as encryption keys 134 or recipient information 166, can be cached for improved and efficient access on a cache servers 150. An entity 102 (e.g., secure email cluster) can employ or provide various encryption procedures or techniques, authentication mechanisms, spam filtering, and other security measures. Entity 102 can include measures to protect sensitive information, prevent unauthorized access, and deliver email services. Entity 102 can provide features like high availability, load balancing, redundancy, and scalability.

Network 106 can include any type of communication network over which two email clusters can exchange emails and data. Network 106 can be a global network of interconnected computers and devices allowing sharing of information and communication between various computed devices worldwide. Network 106 can be established using various types of networks, such as local area networks (LANs), wide area networks (WANs), or the Internet. Network 106 can support different communication protocols for email exchange, including the Simple Mail Transfer Protocol (SMTP) for transferring messages between mail servers, the Internet Protocol (IP) for addressing and routing data packets, and Transmission Control Protocol (TCP) for reliable and ordered delivery of data, or any other type of protocols. For instance, network 106 can utilize protocols such as Ethernet for LAN connectivity, Virtual Private Networks (VPNs) for secure communication over public networks, and Domain Name System (DNS) for resolving domain names to IP addresses.

Domain can include any portion of an email address (e.g., one or more characters) representing a specific enterprise responsible for managing email communication for that address. For example, domain can include a group of characters located after the "@" symbol in an email address, representing a specific organization, entity, or service responsible for managing email communication within that site or domain. Domain can correspond, relate to, or include to a system providing email services for a particular domain name, such as facilitating receipt and sending of emails having a specific domain name.

Mail transport agents (MTAs) 110, also referred to as mail transfer agents 110, including the first MTA 110*a* and the second MTA 110*b*, can include any combination of hardware and software for facilitating the transfer and delivery of email messages between mail servers, such as for example via the SMTP protocol. MTA 110 can be provided as a service (e.g., functionality on a cloud or VPN) or as a server (e.g., SMTP server). MTA 110 can include any computer code or function for routing and transferring email messages between different mail servers in an email communication process. MTA 110 can include the functionality providing or assisting with the transmission and delivery of email messages between mail servers, such as by utilizing rules and protocols of the SMTP to facilitate the exchange of email across different systems. For example, when an email is sent, the sender's MTA 110 can receive the message from the sender's email client and verify the sender's identity through authentication. MTA 110 can then perform checks for spam, virus scanning, and sender reputation. MTA 110 can use DNS to determine the recipient's mail server and establishes an SMTP connection with the recipient's MTA to transfers the email for delivery. For example, the recipient's MTA 110 can receive the email, perform checks and processing, and store the email in the recipient's mailbox for retrieval by their email client.

Each MTA 110 can include any number of simple mail transfer protocol (SMTP) functions 112, including the SMPTP functions 112*a* and SMTP functions 112*b*. SMTP functions 112 can include functions for initiating the email transfer process, functions for establishing a connection with the recipient's mail server, or functions for verifying sender and recipient addresses. SMTP functions 112 can include functions for relaying the email message, performing error handling and notifications, and ensuring reliable and secure delivery of email messages. SMTP functions 112 can include an RCPT_TO command or a function, which can be configured, modified or hooked (e.g., RCPT_TO command 114) to perform a particular set of tasks.

SMTP functions 112 can include a modified or hooked SMTP Hello command (HELO) that can be used by an SMTP client (e.g., the sender) to initiate a connection with the receiving mail server and providing its domain name as an argument. SMTP functions 112 can include a modified or hooked SMTP EHLO command that can include an extended version of the HELO command, initiating a connection and providing information on capabilities about the sender. For example, SMTP function 112 including a HELO or EHLO can be configured to advertise to the User Device (160*a/b*) whether the server supports end-to-end-email encryption.

SMTP functions 112 can include an SMTP DATA function 112 that can be configured to receive the email and headers sent from user device (e.g., 160*a/b*). For example, when user policy (e.g., 124*a/b*), such as ENCRYPT_LOCATION, is set to "REMOTE", the encryption function 116*a* or 116 can run using the hooked SMTP data function 112. For example, encryption function 116*a* can be identified inside the SMTP data function 112.

RCPT_TO command 114 can include any combination of hardware and software configured to use specialized (e.g., hooked) queries to DNS 140 and KS 130 to seamlessly facilitate or provide encryption for a secure end-to-end email delivery. RCPT_TO command 114 can include a mechanism or feature (e.g., specific instructions, settings or commands) that allow for customization or interception of the RCPT_TO command of the SMTP during the email delivery process. For instance, RCPT_TO command 114 can include or allow for a modification or analysis of the way in which the email is handled. RCPT_TO command 114 can include an additional (e.g., customized) logic or instructions that can be implemented s before the email server processes the RCPT_TO command and proceeds with the delivery process.

RCPT_TO command 114 can include functionality (e.g., command or instruction) to query a DNS to fetch service records using, based on, or according to a recipient domain. In response to such a query, DNS can provide the requested service records. RCPT_TO command 114 can include the functionality to query the UPS 120 to determine, based on configurations or policies 124, whether to acquire, use or generate an encryption key 134 (e.g., a symmetric persession encryption key or a public key of the recipient). RCPT_TO command 114 can include the functionality to check a particular encrypt strategy according to UPS records 122 or KS records 132 of a particular recipient. RCPT_TO command 114 can make determinations according to recipient information 116 (e.g., recipient domain name, IP address, or any other user specific information), UPS records 122, KS records 132 or encryption keys 134 of a recipient stored in KS 130 or cached in cache server 150.

RCPT_TO command 114 can include any functionality of a RCPT_TO command of the SMTP protocol. For instance, the RCPT_TO command 114 can include a command used during the email delivery process to specify the recipient or recipients of an email message. When a sender initiates an email transfer, the RCPT_TO command 114 can be used to indicate the destination email address or addresses to which the email should be delivered. Multiple RCPT_TO commands 114 (e.g., RCPT_TO hooks) can be used in a single email transaction to specify multiple recipients.

For example, RCPT_TO command 114 can be used for querying DNS 140 to fetch UPS records 122 records and KS records 132 (e.g., QPK records). The query UPS endpoints can be parsed from the DNS 140 response to query UPS 120 to fetch user policy 124 and KS 130 (e.g., QPK) to fetch public keys 134. After this, depending on policy 124, the RCPT_TO command 114 can determine where to run the actual encryption function 116, such as whether encryption function 116 is to run in the MTA 110 or in the user device 160.

Encryption functions 116, including encryption functions 116*a* and encryption functions 116*b*, can include any combination of hardware and software performing encryption of at least a portion of an email. Encryption function 116 can include the functionality that applies cryptographic techniques to secure the content of an email message. Encryption function 116 can take a plaintext email as input and can convert it into an encrypted form using encryption algorithms and keys. Encryption function 116 can convert an original message into an unreadable format that can only be deciphered with the appropriate decryption key.

Encryption function 116 can employ, utilize or provide an asymmetric encryption, also known as public-key encryption, in which a pair of mathematically related keys, a public key and a private key, can be used for encrypting or decrypting the email. For example, a sender can use the recipient's public key to encrypt the email, ensuring only the recipient with the corresponding private key can decrypt and read the message. Encryption function 116 can employ, utilize or provide a symmetric encryption in which a shared secret key can be used to encrypt and decrypt the email. For example, encryption function 116 can use an Advanced Encryption Standard (AES) algorithm with a shared key to encrypt the email.

In one example, when a user device 160 determines to send an email to a recipient, the user device 160 can begin with an SMTP conversation with MTA 110. The first command in the conversation can include an EHLO SMTP function 112 that can initiate execution of the EHLO or HELO hooked function to send the following response to user device 160:

> EHLO semc.mail.company.com
> 250-semc.mail.company.com says hello
> 250-ENHANCEDSTATUSCODES
> 250-PIPELINING
> 250-CHUNKING
> 250-E2ENCRYPT (RSA|PUBLIC_KEY)
> 250-E2ENCRYPT_PUBLICKEY_CACHE
> 250-E2ENCRYPT_DIGEST
> 250-CLUSTER-TYPE_END-TO-END-ENCRYPTION_
>     USER_POLICY_BACKED For example, the responses from the user device can include: E2ENCRYPT, E2ENCRYPT_PUBLICKEY_CACHE, E2ENCRYPT_DIGEST and CLUSTER-TYPE_END-TO-END-ENCRYPTION_USER_POLICY_BACKED. This can indicate that the server supports end-to-end-email encryption, can cache recipient public keys, can run message-digest functions if the sender shares his/her private key and can also fetch recipient user policies using DNS queries to fetch SRV records for the recipient domain. If the server does not respond with these, then user device 160 can determine that the server does not have the capability to run end-end-email-encryption.

For example, a user device 160 can then initiate an RCPT_TO command 114 that can trigger RCPT_TO hook (e.g., 112 or 114) which can implement, on the email-server or MTA 110 of the sender, a DNS 140 query for fetching UPS endpoint details by querying UPS records 122 that can return a DNS SRV record. The DNS SRV record can include, for example:

> _ups._http.ups.semc.company.com 86400 IN SRV 5 5
>     443 ups.semc.company.com From the DNS query response, RCPT_TO hook (e.g., 112 or 114) can parse out the endpoint for UPS 120. The following attributes can be parsed from the above response:

> service_name=ups
> protocol=http
> name=ups.semc.company.com
> TTL=86400
> class=IN type=SRV
priority=5
weight=5
port=443
target=ups.semc.company.com RCPT_TO hook (e.g., 112 or 114) can then use this endpoint fetched to run a network call to UPS 120. Through the network call, RCPT_TO hook (e.g., 112 or 114) can pull recipient policy information 124, such as:

ENCRYPT_LOCATION (REMOTE/SENDER)
ENCRYPT_CONTENT (BODY-ONLY, SUBJECT-BODY, ATTACHMENT-ONLY, BODY-ATTACHMENT, SUBJECT-BODY-ATTACHMENT, NONE)
ENCRYPT_STRATEGY (symmetric/asymmetric)
DIGITAL_SIGNING (true/false)
CACHING_STRATEGY (whether to cache user policies and keys for future use)
CACING_TTL
DECRYPT_LOCATION (REMOTE/RECIPIENT)

RCPT_TO hook (e.g., 112 or 114) can make a network call to fetch sender's policies from the UPS 120 as well as the sender and recipient's encryption public keys. RCPT_TO hook can first find recipients, such as the KS 130. To do that, RCPT_TO hook 112 or 114 can make a DNS query to fetch SRV records 132 for the recipient domain. This can be the second query, although all SRV records (e.g., from the UPS 120 and KS 130) can be fetched using a single DNS query. The fetched KS record 132 can include the following information:

_qpk._http.qpk.semc.company.com 86400 IN SRV 5 5 443 qpk.semc.company.com

From this DNS query response RCPT_TO hook 112 or 114 can parse out the endpoint for KS 130 to connect using the following attributes parsed from the response:

service_name=qpk
protocol=http
name=qpk.semc.company.com
TTL=86400
class=IN
type=SRV
priority=5
weight=5
port=443
target=qpk.semc.company.com RCPT_TO command 114 (e.g., RCPT_TO hook 112 or 114) can use the endpoint fetched to run network calls to KS 130. For instance, RCPT_TO hook 112 or 114 can make calls to both sender KS 130*a* and recipient KS (e.g., 130*b*) to fetch both the sender and recipient's public keys. For example, a RCPT_TO hook (e.g., 112 or 114) can choose to cache the sender and recipient public keys (134*a/b*) fetched from QPKS (130*a/b*) into Cache Server (150*a*) depending on user policy CACHING_STRATEGY. For instance, cached keys can reduce future network calls to fetch sender and recipient public keys (134*a/b*). Subsequent sender and recipient public keys (134*a/b*) can be fetched from the cache server (150*a*) till CACHE_TTL expires as far as these cache key entries are concerned. Once the RCPT_TO hook (e.g., 112*a* or 114*a*) has pulled the sender and recipient public keys (134*a/b*) fetched from QPKS (130*a/b*), RCPT_TO hook can decide where to run the encryption function. If the user policy (124*b*) that was fetched from UPS (120*b*) has ENCRYPT_LOCATION=REMOTE, then the encryption function (116*a*) can be run inside the MTA (110*a*). If the user policy (124*b*) that was fetched from UPS (120*b*) has ENCRYPT_LOCATION=SENDER, then the encryption function (116*a*) can run inside User-Device (160*a*)

User provisioning services (UPSs) 120, including UPS 120*a* and UPS 120*b*, can include any combination of hardware and software (e.g., a system or a platform) that enables centralized management and provisioning of user accounts, roles, and permissions within an organization's network or system. UPS 120 can be deployed or provided as a service (e.g., on a cloud or VPN) or a server. UPS 120 can include, employ or provide a centralized control over user access, authentication, and authorization processes. UPS 120 can facilitate the creation, modification, and deletion of user accounts, allowing administrators to manage user permissions, roles, and privileges. UPS 120 can integrate with various identity management systems and directories to streamline user provisioning workflows, ensuring that users have appropriate access to resources based on their roles and responsibilities.

UPS records 122, also referred to as the service records for user provisioning services (e.g., including UPS records 122*a* and UPS records 122*b*), can include any type and form of record or information that can be used to facilitate delivery of an email 164. Provisioning service can include a service, such as a computer program or a function, providing UPS records 122 and/or key service records 132, responsive to requests (e.g., RCPT_TO requests). For example, a UPS record 122 (e.g., a SRV record of the UPS 120) can include a DNS related data that can be used to provide information about endpoints of the UPS for the purposes of email delivery. For instance, a UPS record 122 can specify the location and configuration details of UPS 120 servers, enabling email clients and servers to discover and connect to the intended UPS 120 for user account management. An example UPS record 122 can include, for example: "_ups._http.ups.semc.company.com 86400 IN SRV 5 5 443 ups.semc.company.com," which can indicate that the UPS 120 for the domain "semc.company.com" can be reached at the host "ups.semc.company.com" on port 443. The priority and weight values of the UPS record 122 can be both set to "5" and can be used to determine the order of preference among multiple UPS 120 servers. UPS record 122 can include or identify a time-to-live (TTL) value (e.g., a parameter to determine time for which data, such as a record, service or encryption key, can be in the network before being discarded), a class of the record (e.g., protocol family to which the record belongs), a type of the record (e.g., A vs AAAA record, mail exchange or canonical name), a priority of the recipient, a weight of the recipient and a port identifier.

Configurations 124 (e.g., policies), including configurations/policies 124*a* and configuration/policies 124*b*, can include any set of guidelines or rules to define or dictate email handling or services, such as security measures, operational procedures and acceptable practices for handling an email 164 at an entity 102. Configurations 124 can include rules and guidelines for handling encryption/decryption of emails 164 according to, or based on, asymmetric and symmetric encryption. For instance, a configuration 124 can dictate that for a particular recipient, a particular type of encryption/decryption is to be used (e.g., symmetric encryption or asymmetric encryption). For example, configuration 124 can be for an asymmetric encryption, and can reference or indicate information or data for accessing a pair of mathematically related keys (public and private) which can be used to implement the encryption. For example, configuration 124 can be for a symmetric encryption, and can reference or indicate information or data for accessing a particular session-based symmetric key to be used by both the sender and the recipient for the email 164. Configurations 124 can define or dictate the use of specific encryption algorithms (e.g., RSA, AES), key lengths, and certificate management. Configurations 124 can define or dictate a choice of encryption location for a particular recipient (e.g., at the sender or the MTA 110).

Key services (KS) 130, including KS 130a and KS 130b, can include any combination of hardware and software, such as centralized or distributed services or servers, for storing and providing KS records 132 or encryption keys 134 for sending a particular email 164. KS 130, such as a Query Public Key (QPK), can include a component that provides key service (KS) records 132 and encryption keys 134 for specific users (e.g., recipients) within an email system. For instance, upon a query from a RCPT_TO command 114 or other mechanisms, the QPK service can retrieve the KS records 132, which can include information about the encryption keys 134 associated with individual users. These encryption keys 134 can be used for various purposes, such as securing email communication through asymmetric encryption.

KS records 132, also referred to as the service records for encryption keys (e.g., including KS records 132a and KS records 132b) can include any type and form of information or data for facilitating encryption of an email 164. KS record 132 can be accessed or provided, responsive to a query from a RCPT_TO command 114, and can provide information about the location and configuration of a KS 130 for encryption purposes within an email infrastructure. For instance, an example KS record 132 can include: "_qpk._tcp.qpk.semc.company.com 86400 IN SRV 5 5 5001 qpk.semc.company.com", which can indicate that the KS 130 for the domain "semc.company.com" can be reached at the hostname "qpk.semc.company.com" using TCP on port 5001. The priority and weight values of the KS record 132 can both be set to "5" to provide or indicate the order of preference and load balancing among multiple KS 130 servers or services. For example, a KS record 132 can include or identify a time-to-live (TTL) value (e.g., a parameter to determine time for which data, such as a record, service or encryption key, can be in the network before being discarded), a class of the record (e.g., protocol family to which the record belongs), a type of the record (e.g., A vs AAAA record, mail exchange or canonical name), a priority of the recipient, a weight of the recipient and a port identifier.

Encryption keys 134, including encryption keys 134a and encryption keys 134b, can include any cryptographic value or data that can be used to secure and protect data (e.g., email 164) during the encryption and decryption processes. Encryption key 134 can include an asymmetric encryption key pair that can include a public key and a private key. The public key can be shared freely on the network and can be used by the sender to encrypt data. The corresponding private key can be kept confidential by the recipient and can be used by the recipient to decrypt the data. Encryption key 134 can be a symmetric encryption key. For example, encryption key 134 can include a single secret key that can be used for both encryption and decryption and can be shared by the sender and recipient. For instance, in AES encryption, a session-based symmetric key can be generated for a specific email communication session between a sender and a recipient. This session-based key is used to encrypt and decrypt the messages exchanged during that session, ensuring secure and efficient communication between the two parties. Encryption keys 134 can include hashes, such as hash values encrypted using hash keys, which can be inserted into the header of the email 164 being transmitted.

Domain name service (DNS) 140, including DNS 140a and DNS 140b, can include a server or service of a hierarchical naming system that translates domain names to IP addresses, allowing users to access intended targets on the network (e.g., devices of email recipients, websites and services) using human-readable domain names instead of numerical IP addresses. DNS 140 can be configured to include and provide UPS records 122 and KS records 132. DNS 140 can act as a centralized repository of information, enabling the resolution of domain names to their corresponding IP addresses for users on the entity 102 (e.g., senders or recipients of the emails 164).

DNS 140 server can be configured to store and provide (e.g., upon a query from a RCPT_TO command 114) UPS records 122, which can include details about the location and configuration of UPS 120 servers for user provisioning purposes. DNS 140 can be configured to hold and provide (e.g., upon a query from a RCPT_TO command 114) KS records 132, which can provide information on the location and setup of the KS 130 for encryption-related operations. When queried, for example, by a RCPT_TO hook, DNS 140 can respond by providing the requested service records (e.g., the UPS records 122 and KS records 132).

Cache server 150, including cache server 150a and cache server 150b, can include any server for storing frequently accessed data or content in its memory or storage for quick retrieval. Cache server 150 can act as an intermediary between clients and the original source of data, such as an MTA 110 providing email services to users. Cache server 150 can store encryption keys 134, KS records 132 and UPS records 122. When a user requests information (e.g., RCPT_TO command 114 requests an encryption key 134), the cache server 150 can check if it has a cached copy of the requested encryption key 134. If available, the cache server 150 can provide the requested encryption key 134 to the requestor or the intended recipient.

User devices 160, including user device 160a and user device 160b, can include any network device that a user (e.g., sender of the email) can use to draft and send the email 164 to the recipient. User device 160 can include a smartphone, a computer (e.g., a laptop or a workstation), a tablet or any other computing device. User device 160 can include and provide (e.g., execute or run) an email application 162, such as an email client. User device 160 can include an encryption function 116 for providing encryption functionality and can include or store recipient information 166 (e.g., domain name of the recipient, recipient's subdomain, IP address, MAC address or any other information or data for identifying the recipient). For example, a recipient information 166 can include a recipient's email address, such as "user@recipient.com," which can include a local component of the email address (e.g., the "user") and a domain (e.g., "recipient.com").

Figure 2:
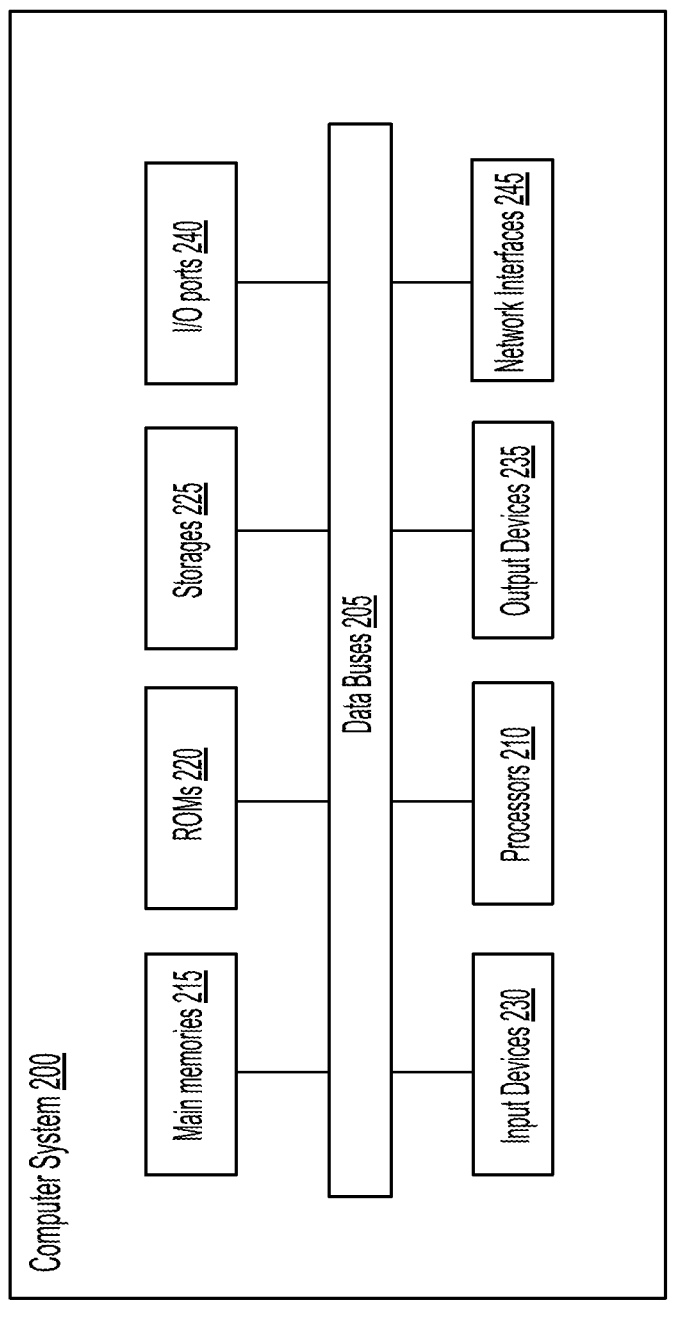
FIG. 2 is a block diagram illustrating an architecture for a computer system that can be employed to implement elements of the systems and methods described and illustrated herein.

FIG. 2 illustrates a block diagram of an example computer system 200, which can also be referred to as a computing system 200. Computer system 200 can include or be used to implement any computation or processing (e.g., command, protocol or data processing) described herein. Computer system 200 can be included in and run any device (e.g., server) or service of a first entity 102a or a second entity 102b. Computer system 200 can be used for operating or running an MTA 110, a UPS 120, a KS 130, a DNS 140, a cache server 150 or a user device 160 and implement any functionality described herein.

Computing system 200 can include at least one bus data bus 205 or other communication component for communicating information and at least one processor 210 or processing circuit coupled to the data bus 205 for processing information. Computing system 200 can include one or more processors 210 or processing circuits coupled to the data bus 205 for exchanging or processing data or information. Computing system 200 can include one or more main memories 215, such as a random access memory (RAM), dynamic RAM (DRAM) or other dynamic storage device, which can be coupled to the data bus 205 for storing information and instructions to be executed by the processor(s) 210. Main memory 215 can be used for storing information (e.g., data, computer code, commands or instructions) during execution of instructions by the processor(s) 210.

Computing system 200 can include one or more read only memories (ROMs) 220 or other static storage device coupled to the bus 205 for storing static information and instructions for the processor(s) 210. Storage 225 can include any storage device, such as a solid state device, magnetic disk or optical disk, which can be coupled to the data bus 205 to persistently store information and instructions.

Computing system 200 may be coupled via the data bus 205 to one or more output devices 235, such as speakers or displays (e.g., liquid crystal display or active matrix display) for displaying or providing information to a user. Input devices 230, such as keyboards, touch screens or voice interfaces, can be coupled to the data bus 205 for communicating information and commands to the processor(s) 210. Input device 230 can include, for example, a touch screen display (e.g., output device 235). Input device 230 can include a cursor control, such as a mouse, a trackball, or cursor direction keys, for communicating direction information and command selections to the processor(s) 210 for controlling cursor movement on a display.

Computer system 200 can include input/output ports 240, also referred to as I/O ports 240, can include physical interfaces that facilitate or provide communication between external or peripheral devices and processor(s) 210 and/or memory 215. I/O ports 240 can be connected to data bus 205, allowing the transfer of data between the processor(s) 210, memories 215, and any external devices (e.g., keyboards, mice, printers, and external storage devices). Computer system 200 can also include one or more network interfaces 245 coupled via data buses 205. Network interfaces 245 can include any physical or virtual components enabling communication between the computer system 200 and any external networks (e.g., the Internet). Network interface 245 can provide transfer of data between the processor(s) 210, memories 215 and any external networks.

The processes, systems and methods described herein can be implemented by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors 210 in a multi-processing arrangement may also be employed to execute the instructions contained in main memory 215. Hard-wired circuitry can be used in place of or in combination with software instructions together with the systems and methods described herein. Systems and methods described herein are not limited to any specific combination of hardware circuitry and software.

Although an example computing system has been described in FIG. 2, the subject matter including the operations described in this specification can be implemented in other types of digital electronic circuitry, or in computer software, firmware, or hardware, including the structures disclosed in this specification and their structural equivalents, or in combinations of one or more of them.

In one example, a system 100 can include one or more processors 210 coupled with memory 215 and configured (e.g., via instructions or commands stored in memory 215) to receive a request to transmit an email 164a to a recipient identified by a domain of the recipient. The domain of the recipient can be included in recipient information 166a and can identify the domain name of the service or location at which the email 164a is to be transmitted. The request can be received from a user device 160 of a sender at a first entity 102 to which the user device 160 of the sender is connected.

One or more processors 210 can be configured to transmit a first query (e.g., a query of an SMTP protocol from a RCPT_TO command 114) to a DNS 140 to fetch one or more records (e.g., UPS records 122 or KS records 132). The one or more records (e.g., 122 or 132) can correspond to, reference or indicate the domain of the recipient. The one or more records (e.g., 122 or 132) can identify a KS 130. Identified KS 130 can be a KS 130 corresponding to or associated with the domain of the recipient.

One or more processors 210 can be configured to receive, from the KS 130 in response to a second query (e.g., from the RCPT_TO command 114) to the KS 130, an encryption key 134a for encrypting the email 164. The received encryption key 134a can be a key corresponding to the domain of the recipient and can be identified (e.g., by the DNS 140) responsive to the recipient information 166a of the recipient.

One or more processors 210 can be configured to encrypt at least a portion of the email 164a, according to, based at least on, or using the encryption key 134a. For example, the one or more processors 210 can encrypt a payload of the email (e.g., text written by the user), a portion of the payload or the entire email 164a. One or more processors 210 can transmit the encrypted email 164a to the recipient. The email can be transmitted from the first entity 102a (e.g., of the sender), via the network 106, to the second entity 102b of the recipient.

The one or more processors 210 can be configured to intercept a RCPT_TO command 114a for the email 164a. The intercepted RCPT_TO command 114 can be configured to transmit the first query to the DNS 140 and also transmit the second query to the KS 130. The RCPT_TO command 114 can be hooked or configured to implement the first and the second query as a part of the seamless email delivery absent any pre-exchange the encryption keys or pre-negotiation of encryption or decryption protocols. The one or more records at the DNS 140 can include a time-to-live (TTL) value, a class of the record, a type of the record, a priority of the recipient, a weight of the recipient and a port identifier.

The one or more processors 210 can be configured to receive, from the DNS 140 responsive to the first query, a first record (e.g., KS record 132) of the one or more records. The first record can identify the KS 130 for providing the encryption keys 134a for the intended recipient (e.g., identified in recipient info 166a). The one or more processors 210 can be configured to receive, responsive to the first query, a second record (e.g., UPS record 122) of the one or more records identifying a provisioning service (e.g., UPS 120). The identified UPS 120 and the KS 130 can correspond to, be referenced by or relate to the recipient information 166a, including for example a domain (e.g., domain name)

of the recipient's email address, based on which the MTA 110 and/or DNS 140 can identify the UPS 120 and KS 130.

The one or more processors 210 can be configured to identify a configuration 124a (e.g., a policy) for encrypting the email by a sender of the email 164a. The configuration 124a can be a configuration specifying that the sender device (e.g., user device 160a) is to encrypt at least a portion of the email 164a. The configuration 124a can identify the type of encryption (e.g., symmetric or asymmetric), as well as whether the encryption key 134a is to be generated for a session between the sender and the recipient. The one or more processors 210 can be configured to transmit, responsive to the configuration 124a, the second query to the key service 130 requesting the encryption key 134a.

The one or more processors 210 can be configured to identify a configuration 124a for encrypting the email 164a by a sender (e.g., at the first entity 102a) of the email and decrypting the email by the recipient (e.g., at the second entity 102b) using the encryption key 134a. The one or more processors 210 can be configured to generate, responsive to the configuration 124a, the encryption key 134a for a session between the sender and the recipient.

For example, once recipient MTA (e.g., 110b) receives the email from the sender, it can deliver the email encrypted to the recipient user device (e.g., 160b). The decryption process can run in the recipient user device (e.g., 160b). Decryption process can first check the header X-E2ENCRYPT-SUPPORTED: TRUE. If the is set to true, the recipient user device 160b or its MTA can determine that the message was end to end encrypted. The user device 160b can then determine or identify the encrypt strategy using the header ENCRYPT_STRATEGY. If the ENCRYPT_STRATEGY=ASSYMETRIC_PUBLIC_KEY, then user device 160b can decrypt the message using recipient private key (e.g., from recipient information 166b). The user device 160b can decrypt any parts of the mail that were encrypted based on the value of the header X-ENCRYPT_CONTENT. For instance, if ENCRYPT_STRATEGY=PER_SESSION_SYMMETRIC_KEY then, the device can read and encrypt the value of the header X-E2ENCRYPT-PER_SESSION_SYMMETRIC_KEY. To implement the fetch, the symmetric key can decrypt the parts of the mail that were encrypted based on the value of the header X-ENCRYPT_CONTENT. For example, if the X-E2ENCRYPT-DIGITALLY-SIGNED header is present and set to true, then the decryptor computes message digest of the encrypted portions and compares the message digest with the digest value present in the header X-E2ENCRYPT-DIGITAL-SIGNATURE, thereby completing the decryption process.

The one or more processors 210 can be configured to identify a configuration for caching the encryption key 134a. The one or more processors 210 can be configured to cache the encryption key 134a on a cache server 150a, responsive to the configuration 124a. The one or more processors 210 can be configured to determine, according to a configuration 124a of a UPS 120a, that a location for encrypting the email 164a is one of the sender (e.g., user device 160) or the MTA 110. The one or more processors 210 can be configured to encrypt, by one of a sender (e.g., user device 160) of the email 164a or an MTA 110 responsive to the determined location, the at least the portion of the email by one of the sender (e.g., user device 160) or the MTA 110. The one or more processors 210 can be configured to determine, based on a configuration 124a of a UPS 120a, that a hash value is to be included into the email 164a. The one or more processors 210 can be configured to insert, responsive to the configuration 124a, the hash value in a header of the email 164a to be transmitted.

Figure 3:
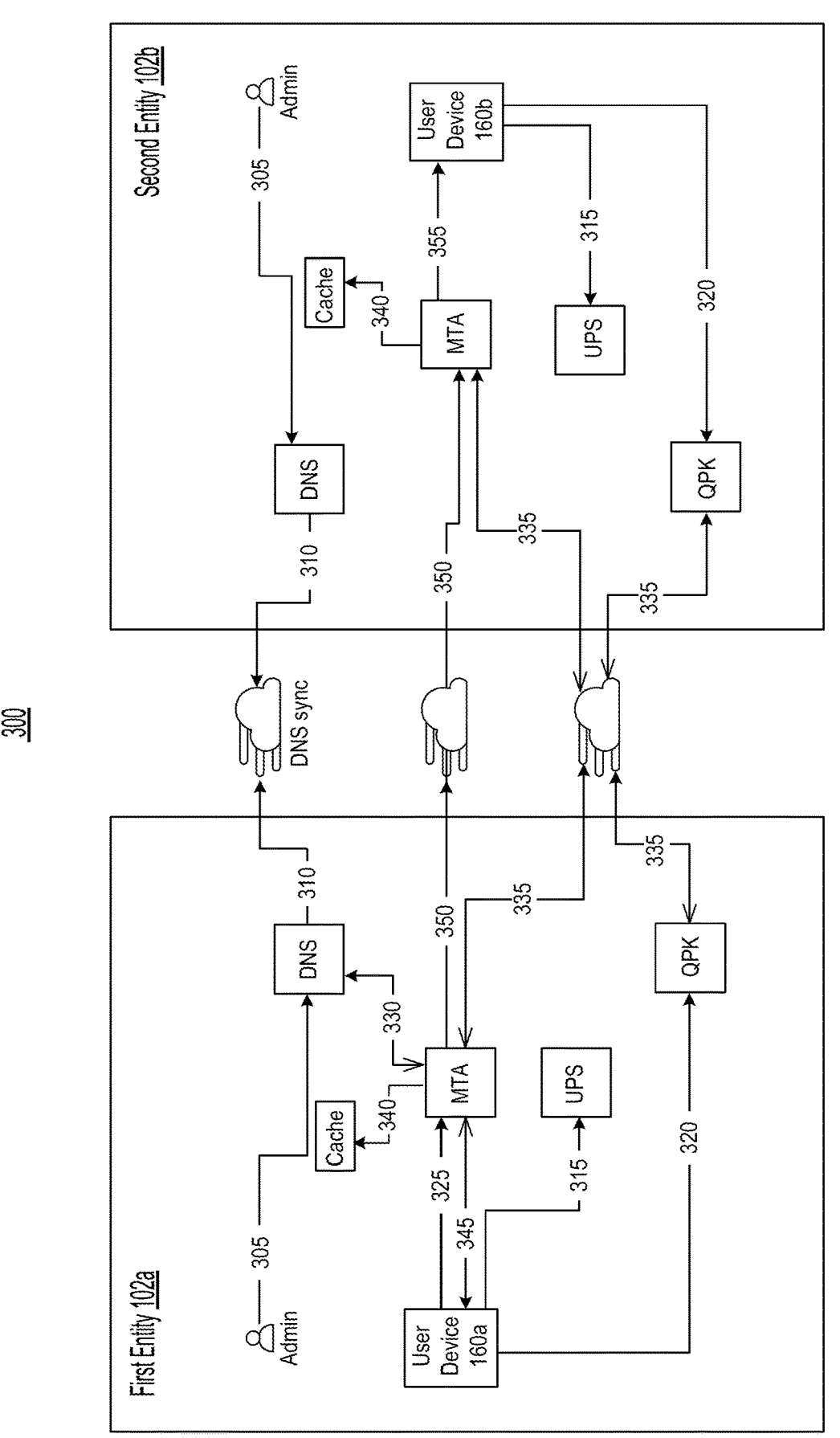
FIG. 3 is a flow diagram of a method for establishing a system and providing a seamless end-to-end email encryption and delivery between secure email clusters.

FIG. 3 is a flow diagram of a method 300 for establishing a system and providing a seamless end-to-end email encryption and delivery between secure email clusters. Method 300 can include acts 305-355 that can be performed by example system 100 whose components can utilize the features of the computing system 200. At 305, administrators can set up their respective DNS services. At 310, DNS services can synchronize their data with DNSs of other entities. At 315, user provisioning can be implemented. At 320, the user can set up the encryption related configurations (e.g., policies). At 325, the user can generate an email to transmit to the recipient. At 330, a configured RCPT_TO command (e.g., RCPT_TO hook) can send a first query to the DNS. At 335, a configured RCPT_TO command (e.g., RCPT_TO hook) can send a second query to KS service for an encryption key to use for the email. At 340, depending on the caching configuration, the key can be accessed via a cache server. At 345, the email can be encrypted at the location determined by the encryption location configuration. At 350, the MTA of the sender can route the email to the MTA of the recipient. At 355, the MTA of the recipient can deliver the email to the recipient user.

Prior to implementing acts 305-355, both the sender and the recipient entities (e.g., domains) can individually be configured to support several functionalities or features. For example, a Query Public Key (QPK) Service can be configured to support the ability to query and fetch user public keys over standard network queryable interfaces, such as HTTP/DNS/RPC. For instance, Query Public Key (QPK) can be either a REST or an HTTP or an RPC service.

For example, the entities can be configured to allow the users to choose to generate their own cryptography key-pair using self-signed key generation tools inside User Provisioning Service or to choose to generate self-signed cryptography key-pairs through User Provisioning Service and upload it QPK Service. For example, senders and recipient domains could also host their own Enterprise Public Key Infrastructure (PKI) to generate cryptography key-pairs. An Enterprise PKI can allow senders and recipients to include or support signed cryptography key-pairs that can ensure that the keys are verifiable during the encryption process.

For example, DNS Servers can be configured to publish several records. For instance, a DNS server can publish MX record indicating the domain's inbound and outbound Email-Servers/MTAs. DNS server can publish SRV record indicating the domain's Query Public Key (QPK) Service endpoint. For example, a sample SRV record can be: "_qpk._tcp.qpk.semc.company.com 86400 IN SRV 5 5 5001 qpk.semc.company.com"

For example, sender and recipient entities can both be configured to include or support Email-Servers/MTAs associated with the sender's and recipient's logical enterprise domains for sending/receiving emails. Sender and recipient can both be configured with Email-Servers/MTAs associated with the sender's and recipient's logical enterprise domains for sending/receiving emails that can be configured to support extension services in the form of SMTP hooks.

For example, sender and receiver entities can be configured to support an EHLO hook as a shared-library/jar/sar-file depending on the email server that can be used to send/receive/route emails that would support/add the following to the HELO/EHLO response. For example, sender and receiver can be configured to support the string "CLUSTER-TYPE_END-TO-END-ENCRYPTION" or "CLUS- TER-TYPE_END-TO-END-ENCRYPTION USER_POLI-CY_BACKED." In other words, the sender and receiver entities can publish to connecting mail clients that this MTA supports end-to-end-email-encryption. For example, the string "CLUSTER-TYPE_END-TO-END-ENCRYPTION" can indicate that the server supports end-to-end-encryption but does the encryption/decryption on the server-side. This can ensure that existing AS/AV/DLP workloads run as-is on the server. For example, the string "CLUSTER-TYPE_END-TO-END-ENCRYPTION_USER_POLICY_BACKED" can indicate that the server supports end-to-end-encryption and user's configured policies decide where the encryption would be done (e.g., server-side/client-side).

For example, sender and receiver entities can be configured to support RCPT_TO hook which can be published as a shared-library/jar/sar-file depending on the email server that is being used to send/receive/route emails. The library can support the recipient's domain being extracted from the recipient's email address, the recipient domain's SRV record being queried to fetch its QPK server's endpoint and making a network call to the recipient domain's internet-facing QPK REST/HTTP/RPC API address to fetch the recipient's public key.

Depending on the sender's encryption policy the entities can be configured to allow the recipient's public key to be cached in the Email-Server/MTA's session and/or be sent as an RCPT_TO hook response to the client. For example, RCPT_TO hook can be configured to handle a setting, such as "ENCRYPT_LOCATION=REMOTE, CACHING STRATEGY=NONE", a setting, such as "ENCRYPT_LOCATION=SENDER, CACHING STRATEGY=NONE", a setting, such as "ENCRYPT_LOCATION=REMOTE, CACHING_STRATEGY=CACHE" or a setting, such as "ENCRYPT_LOCATION=SENDER, CACHING STRATEGY=NONE." Depending on the sender's encryption strategy policy ENCRYPTION_STRATEGY the RCPT_TO hook can decide whether to apply public key encryption or to generate a random per session symmetric key.

For example, a User Provisioning/Registration Service (UPS) can be configured to allow new users/domain-administrators to create a new email account, set per-user encryption policies, create-new/upload-existing user's public-private key pair and store user public keys in the enterprise domain's QPK service, set end-user encryption/decryption policies, and provide user administration rest interfaces to the QPK service. The entities can be configured to support a Secure Email Client (SEC) that can allow a user to generate Public/Private Key pairs and to add his/her private cryptography key into the client, as well as upload the user's public cryptography key to QPK service.

At 305, administrator of each entity 102 can add a KS record and UPS record into the DNS of its respective entity. For example, an administrator can add or configure a KS record (e.g., QPK endpoint service record) to DNS, such as: _qpk._tcp.qpk.semc.company.com 86400 IN SRV 5 5 5001 qpk.semc.company.com. For example, admin can add a UPS record (e.g., UPS endpoint service record) to DNS, such as: _ups._http.ups.semc.company.com 86400 IN SRV 5 5 443 ups.semc.company.com.

At 310, the DNSs of each entities can set up, synchronize and configure their own DNSs to include the UPS records and KS records of other DNSs. For instance, a DNS of the first entity can synchronize its service records (e.g., UPS records and KS records) with a second DNS of the second entity, and vice versa. For instance, DNS protocol can sync entries across the sender and recipient domain DNS servers using standard preexisting over-the-network processes. This can apply to both, the sender.com and recipient.com domains, as well as any other domains and entities.

For example, a secure email cluster administrator can setup in DNS an MX record that can include or indicate the outbound email server's hostname and IP address, and an SRV record that holds the QPK server's endpoint address. For example, the administration can include "_qpk._tcp.qpk.semc.company.com 86400 IN SRV 5 5 5001 qpk.semc.company.com." For example, the administrator can include "qpk._http.qpk.semc.company.com 86400 IN SRV 5 5 443 qpk.semc.company.com." For example, the administrator can include "_qpk._rpc.qpk.semc.company.com 86400 IN SRV 5 5 9001 qpk.semc.company.com." For example, an administrator can include a TXT/SRV record that can include or indicate the User Provisioning/Registration Service endpoint address, such as "_ups._http.ups.semc.company.com 86400 IN SRV 5 5 443 ups.semc.company.com."

At 315 user provisioning can be implemented at the sender's entity. For instance, a user on a user device can create a new email account and register it with the UPS. The user can generate encryption keys that the user intends to use for its emails (e.g., emails which the user will receive). For example, the user can configure or generate an asymmetric encryption key pair that can include a public key and a private key for the user. The user can upload the public key to the key service (e.g., QPK) using the UPS. For example, the KS can receive the encryption keys of the user from the UPS, once the user generates the keys.

For example, a new user can register with the Secure Email Cluster using the User Provisioning Service (UPS). The user can be prompted to either upload his/her existing self-signed or any commercial/open-source externally hosted PKI signed public cryptography key into User Provisioning Service (UPS) service or to create a new self-signed cryptography key pair using existing tools in the User Provisioning Service (UPS). For example, a cryptography key-pair may be generated by the optional user domain's hosted Public Key Infrastructure (PKI) if the user's SEMC has one. The private cryptography key can be kept with or securely sent back to the user depending on the key-pair generation process, the public cryptography key can be saved both in the User Provisioning Service (UPS) as well as in the Query Public Key (QPK) service.

At 320, the user can set up the encryption related configurations (e.g., policies). Configurations can include an encryption location configuration for determining the location at which the encryption will be performed, such as at sender or at the MTA (e.g., ENCRYPT LOCATION configuration). Configuration can include an encryption content configuration for defining or identifying the content that is to be encrypted (e.g., ENCRYPT-CONTENT configuration). Configuration can include encryption strategy configuration to identify or define the type of configuration to perform (e.g., asymmetric or symmetric), (e.g., ENCRYPT-STRATEGY configuration). Configuration can include a digital signing configuration to determine digital signatures, such as should the message be digitally signed for the recipient to verify (e.g., DIGITAL-SIGNING configuration). Configuration can include a caching strategy for identifying or determining how caching is to be performed and to which cache server (e.g., CACHING_STRATEGY configuration). Configuration can include a cache time to life (TTL) strategy to identify or define the time duration for which a particular encryption key is to be stored at the cache (e.g., CACHE_TTL configuration).

The user can be asked to set encryption decryption policies in the User Provisioning Service (UPS). An example policy can include ENCRYPT_CONTENT, for which example values or settings can be "BODY-ONLY" to indicate that the encryption is only for the body of the email, "SUBJECT-BODY" to encrypt the subject and the body of the email, "ATTACHMENT-ONLY" to encrypt only attachment of the email, "BODY-ATTACHMENT" to encrypt body and attachment, "SUBJECT-BODY-ATTACHMENT" to encrypt subject, body and attachment, or "NONE" to provide no encryption for the email. The policy can include "ENCRYPT_LOCATION", for which example settings or values can include "REMOTE" to indicate that encryption is to occur in the Email Delivery hook on the sender's Email-Server/MTA, or "SENDER" to indicate that the encryption happens in the Email Client, provided the email client supports Public-Key encryption.

An example policy can include "ENCRYPT_STRAT-EGY", for which policy values can include "ASSYMET-RIC_PUBLIC_KEY" to indicate to use the recipient's public key for encryption, "PER_SESSION_SYMMETRIC_KEY" to generate a symmetric key on a per session basis. An example policy can include "DIGITAL_SIGNING" for which values or settings can include "TRUE" to indicate the email content's digest prior to encryption would be signed using the sender's private key, or "FALSE" to indicate the email content's digest would not be signed.

An example policy can include "CACHING_STRAT-EGY" for which possible values or settings can include "CACHE" to indicate that the recipient keys would be cached in an external cache server if available, or "NOCACHE" to indicate recipient keys would not be cache and would be fetched every time. An example policy can include "DECRYPT_LOCATION" for which possible values can include "REMOTE" indicating that decryption would be done in the recipient's MTA. This can allow existing anti-spam, anti-virus and/or data loss prevention (DLP) workloads to scan the email. If the user enable's this setting, then the user would be prompted to upload his/her private key that would be stored using a one-way symmetric key in the recipient domain's Query Public Key (QPK) Service. The recipient's MTA can pull the private key during the mail delivery session and decrypt the message in the MTA. Another value or setting can include "RECIPIENT" to indicate that decryption would happen in the recipient's client. Recipient's private key may be not stored in the recipient domain's Query Public Key (QPK) Service.

At 325, the user can generate an email to be sent to the recipient. For instance, a sender email address (e.g., user@sender.company.com) with a sender domain (e.g., company.com) can connect to its MTA to send the email to a recipient domain email address (user@recipient.company.com) with recipient domain (e.g., company.com).

At 330, at the MTA (e.g., SMTP server) a RCPT_TO command that has been modified or hooked to conduct queries to the DNS and key services, can send a query to the sender's DNS to fetch service records (e.g., KS records or UPS records) for the recipient domain. For example, a RCPT_TO command can query a DNS service for service records corresponding to the recipient.com domain. In response to this query from the hooked RCPT_TO command, the DNS can respond with the requested service records. For example, the DNS response can include: "_qpk._http.qpk.semc.company.com 86400 IN SRV 5 5 443 qpk.semc.company.com" (e.g., KS record) and "_ups._http. ups.semc.company.com 86400 IN SRV 5 5 443 ups.semc. company.com" (e.g., UPS record).

At 335, the configured RCPT_TO command (e.g., RCPT_TO hook) for the user@sender.semc.company.com can query the fetched KS service endpoint for recipient's public key. In some examples, depending on the configuration/policy for encryption, such as the ENCRYPT_STRAT-EGY configuration, the RCPT_TO command (e.g., RCPT_TO hook) can decide on whether to generate an additional per-session symmetric key. For example, if ENCRYPT STRATEGY configuration is for an asymmetric public key, then per-session symmetric key is not generated, but rather the public key is used to encrypt at least a portion of the email. For example, if ENCRYPT_STRATEGY configuration is for a per session symmetric key, then a per-session symmetric key is generated. This key can be encrypted using the sender's public key.

At 340, depending on the sender's CACHING_STRAT-EGY configuration, the hooked RCPT_TO command can decide on whether to cache the recipient public key and/or per-session symmetric key. In some instances, there may be no caching strategy and no caching is performed (e.g., there is no cache server).

At 345, depending on the sender's ENCRYPT_LOCA-TION configuration, the hooked RCPT_TO command either holds the recipient public key and/or symmetric key in the MTA SMTP session or sends it to tile client. The sender can receive an RCPT_TO response. If ENCRYPT LOCATION configuration identifies the sender as the location, then the sender's user device can proceed to encrypt portions of the email designated for encryption using either the recipient's public key or the generated per-session symmetric key. If the ENCRYPT LOCATION configuration identifies the location as a remote location, then the sender can send the plain-text email to the MTA and the MTA can implement the encryption using the recipient key or the per-session symmetric key that it holds in its current session. The per-session symmetric key can be encrypted using the recipient's public key and the encrypted symmetric key is added as an email header. For example, the email header can be: X-E2ENCRYPTPER_SESSION_SYMMETRIC_KEY.

If a DIGITAL_SIGNING configuration is enabled, then prior to sending the email to the MTA, the sender can generate a message digest and encrypt the digest using the sender's private key. The sender can add a header into the message, as follows: "X-E2ENCRYPT-DIGITAL-SIGNA-TURE: <base64_encoded_sender_private_key_encrypted_ message_digest>". The header can be read by the recipient, and the base64 decoded and the encrypted message digest would be decrypted using the sender's public key by the recipient's email client. At this point, the email can be encrypted.

At 350, the MTA of the sender entity can route the encrypted email to the MTA of the recipient entity. For example, the MTA corresponding to the user@sender.semc.company.com can route the email to the MTA of the user@recipient.semc.company.com.

At 355, the MTA of the user@recipient.semc.company.com domain can deliver the encrypted email to the intended user. Recipient's email application can read the header X-E2ENCRYPT-SUP-PORTED. If the header value is set to true, then the recipient can determine that this email includes encrypted text that is to be decrypted. Then, the recipient email application can read the header X-E2ENCRYPT. If the header includes or references an ENCRYPT_STRATEGY that identifies an asymmetric public key, then the recipient device can decrypt the message using the recipient's private key. If the header includes or identifies ENCRYPT STRATEGY configuration that identifies per session symmetric key usage, then the recipient's email client can read the header X-E2ENCRYPTPER_SESSION_SYMMETRIC_KEY and decrypt the email using the per-session symmetric key.

In one example scenario, or use case, both the sender and recipient endpoints can include Secure Email Cluster (SEMC) of their own with CLUSTER-TYPE_END-TO-END-ENCRYPTION_USER_POLICY_BACKED. A sender can send an EHLO to outbound Mail-Server/MTA in his/her Secure Email Cluster (SEMC). The sender's Mail-Server/MTA's EHLO SMTP hook can respond with the following including the fact that the cluster supports End-to-End-Encrypted Email:

EHLO secure.mail.company.com
    250-secure.mail.company.com says hello
    250-ENHANCEDSTATUSCODES
    250-PIPELINING
    250-CHUNKING
    250-E2ENCRYPT (RSA|PUBLIC_KEY)
    250-E2ENCRYPT_PUBLICKEY_CACHE
    250-E2ENCRYPT_DIGEST
    250-CLUSTER-TYPE_END-TO-END-ENCRYPTION_
        USER_POLICY_BACKED The server's EHLO SMTP hook can respond to state that the server supports CLUSTER-TYPE_END-TO-END-ENCRYPTION_USER_POLICY_BACKED. Email clients supporting End-To-End Email Encryption can acknowledge the EHLO response and initialize corresponding encryption/decryption libraries depending on the sender's ENCRYPT LOCATION policy. If the sender's ENCRYPT_LOCATION policy is "REMOTE" then no encryption libraries may be initialized in the client. If the sender's ENCRYPT_LOCATION policy is "SENDER" then appropriate encryption libraries can be initialized by parsing the EHLO response line "250-E2ENCRYPT (RSA|PUBLIC_KEY)"

Also, the sender can send an RCPT_TO to outbound Mail-Server/MTA in Secure Email Cluster (SEMC). Sender's MailServer/MTA's RCPT_TO SMTP hook, as part of his/her Secure Email Cluster (SEMC) can extract the domain from the recipient address, query the DNS to fetch the recipient domain's SRV record that holds the recipient domain's, query Public Key (QPK) server endpoint, query the Query Public Key (QPK) server to fetch the endpoint address from where to fetch the recipient's public key, or recall that the SRV record looks like "_qpk._http.qpk.semc. company.com 86400 IN SRV 5 5 443 qpk.semc.company. com."

Depending on the configured sender policy ENCRYPT_LOCATION, the entity can take one of the following actions. For instance, if ENCRYPT_LOCATION="REMOTE" and ENCRYPT_STRATEGY="ASSYMETRIC_PUBLIC_KEY", then the entity can hold the recipient's public key in the current SMTP session. If ENCRYPT_LOCATION="REMOTE" and ENCRYPT_STRATEGY="PER_SESSION_SYMMETRIC_KEY", then the entity can generate a random symmetric key and hold the recipient's public key, and this generated random symmetric key in the current SMTP session. If ENCRYPT_LOCATION="SENDER" and ENCRYPT_STRATEGY="ASSYMETRIC_PUBLIC_KEY", the entity can send the recipient's public key as part of the RCPT_TO response. If ENCRYPT_LOCATION="SENDER" and ENCRYPT STRATEGY="PER_SESSION_SYMMETRIC_KEY", the entity can generate a random symmetric key, encrypt this random symmetric key with the sender's public key and send the sender public key encrypted random symmetric key to the client using the header "X-E2ENCRYPT-PER_SESSION_SYMMETRIC_KEY." The entity can hold the recipient's public key and the generated random symmetric key in the current SMTP session.

For example, the sender can send email content to be sent to the recipient using DATA command. Depending on the configured sender policy ENCRYPT_LOCATION, one of the following actions is taken. If ENCRYPT_LOCATION="REMOTE" and ENCRYPT_STRATEGY="ASSYMETRIC_PUBLIC_KEY", the server can receive the data from the client and encrypt the sender DATA using the SMTP session held recipient's public key. If the server supports message digest and digitally signing the message it can create a digest of the message prior to encryption and encrypt the message digest using the recipient's public key. If ENCRYPT_LOCATION="REMOTE" and ENCRYPT_STRATEGY="PER_SESSION_SYMMETRIC_KEY", then the server can receive the data from the client and encrypt the sender data using the random symmetric key held in session. If ENCRYPT_LOCATION="SENDER" and ENCRYPT_STRATEGY="ASSYMETRIC_PUBLIC_KEY", then the client can encrypt the sender DATA prior to actually sending the data to the server using the recipient's public key sent back as part of RCPT_TO hook response. If ENCRYPT_LOCATION="SENDER" and ENCRYPT_STRATEGY="PER_SESSION_SYMMETRIC_KEY", then the client can decrypt the per session symmetric key, that was sent back to the client as RCPT_TO hook response, using the sender's private key that only the sender has access to. Client can encrypt the sender DATA prior to actually sending the data to the server using the per session symmetric key.

For example, for ENCRYPT_LOCATION="SENDER" and ENCRYPT_STRATEGY="ASSYMETRIC_PUBLIC_KEY", if the sender configured policy DIGITAL_SIGNING is configured to true, then the following header can be added "X-E2ENCRYPT-DIGITAL-SIGNATURE: <base64_encoded_sender_private_key_encrypted_ message_digest>". For example, for ENCRYPT_LOCATION="SENDER" and ENCRYPT_STRATEGY="PER_SESSION_SYMMETRIC_KEY", if the sender configured policy DIGITAL_SIGNING is configured to true then the following header can be added "X-E2ENCRYPT-DIGITAL-SIGNATURE: <base64_encoded_sender_private_key_encrypted_ message_digest>." For example, for ENCRYPT_LOCATION="SENDER", if the client is successful in encrypting the content an additional header can be added into the message "X-E2ENCRYPT-CLIENT: TRUE". For example, ENCRYPT_LOCATION="SENDER", if the client fails in encrypting the content, an additional header can be added into the message "X-E2ENCRYPT-CLIENT: FALSE".

The actual content to encrypt can depend on the sender's configured policy ENCRYPT_CONTENT. Once the server has the encrypted content, additional set of headers can be added into the email by the server for the recipient to be able to apply decryption rules on the message. If ENCRYPT_LOCATION="REMOTE" and ENCRYPT_STRATEGY="ASSYMETRIC_PUBLIC_ KEY", then the following headers can be added "X-E2ENCRYPT-SUPPORTED: TRUE", "X-E2ENCRYPT: ENCRYPT_LOCATION=REMOTE, ENCRYPT_LIB=(RSA|PUBLIC_KEY)", or "ENCRYPT_STRATEGY="ASSYMETRIC_PUBLIC_ KEY", ENCRYPT_CONTENT=BODY-ONLY".

If the sender policy DIGITAL_SIGNING is configured, then a header can be added "X-E2ENCRYPT-DIGITAL-SIGNATURE: <base64_encoded_sender_private_key_encrypted_ message_digest>". If ENCRYPT_LOCATION="REMOTE" and ENCRYPT_STRATEGY="PER_SESSION_ SYMMET-RIC_KEY", then the following headers can be added: "X-E2ENCRYPT-SUPPORTED: TRUE", "X-E2ENCRYPT-PER_SESSION_SYMMETRIC_KEY: <base64_encoded_recipient_public_key_encrypted_per_ session_symmetric_key>", "X-E2ENCRYPT: ENCRYPT_LOCATION=REMOTE, ENCRYPT_LIB= (RSA|PUBLIC_KEY|PER_SESSION_SYMMETRIC), ENCRYPT_STRATEGY="PER_SESSION_ SYMMET-RIC_KEY", ENCRYPT_CONTENT=BODY-ONLY".

If the sender policy DIGITAL_SIGNING is configured, then the following header can be added: "X-E2ENCRYPT-DIGITAL-SIGNATURE: <base64_encoded_sender_private_key_encrypted_ message_digest>." If ENCRYPT_LOCATION="SENDER" and ENCRYPT_STRATEGY="ASSYMETRIC_PUBLIC_ KEY", then the following headers can be added: "X-E2ENCRYPT-SUPPORTED: TRUE", "X-E2ENCRYPT: ENCRYPT_LOCATION=SENDER, ENCRYPT_LIB=(RSA|PUBLIC_KEY), ENCRYPT_STRATEGY="ASSYMETRIC_PUBLIC_ KEY", ENCRYPT_CONTENT=BODY-ONLY".

If ENCRYPT_LOCATION="SENDER" and ENCRYPT_STRATEGY="ASSYMETRIC_PUBLIC_ KEY", then the following headers can be added: "X-E2ENCRYPT-SUPPORTED: TRUE", "X-E2ENCRYPT-PER_SESSION_SYMMETRIC_KEY: <base64_encoded_recipient_public_key_encrypted_per_ session_symmetric_key>", "X-E2ENCRYPT: ENCRYPT_LOCATION=SENDER, ENCRYPT_LIB= (RSA|PUBLIC_KEY|PER_SESSION_SYMMETRIC)", "ENCRYPT_STRATEGY="PER_SESSION_ SYMMET-RIC_KEY", ENCRYPT_CONTENT=BODY-ONLY." If the sender policy DIGITAL_SIGNING is configured, then the following header can be added "X-E2ENCRYPT-DIGITAL-SIGNATURE: <base64_encoded_sender_private_key_encrypted_ message_digest>"

If the client fails to encrypt the data for some reason, then the header value for X-E2ENCRYPT-SUPPORTED can be false. This can mean that the recipient can be informed that even though encryption was attempted for untold reasons the client was not able to encrypt the data and that the email being routed is in plain-text. The header values in this case can look like the following: "X-E2ENCRYPT-CLIENT: FALSE", which can be set by the client if it fails to encrypt the data, "X-E2ENCRYPT-SUPPORTED: FALSE", which can correspond to the server reading the X-E2ENCRYPT-CLIENT header and if it is false then it sets X-E2ENCRYPT-SUPPORTED to false. The header values can include "X-E2ENCRYPT-PER_SESSION_SYMMET-RIC_KEY: <base64_encoded_recipient_public_key_encrypted_per_ session_symmetric_key>", "X-E2ENCRYPT: ENCRYPT_LOCATION=SENDER, ENCRYPT_LIB= (RSA|PUBLIC_KEY|PER_SESSION_SYMMETRIC),

ENCRYPT_STRATEGY="PER_SESSION_ SYMMET-RIC_KEY", ENCRYPT_CONTENT=BODY-ONLY".

For ASSYMETRIC_PUBLIC_KEY based encryption if the client fails to encrypt the data then these set of headers can have the following values: "X-E2ENCRYPT-CLIENT: FALSE", which can be set by the client if it fails to encrypt the data, "X-E2ENCRYPT-SUPPORTED: FALSE", where the server reads the X-E2ENCRYPT-CLIENT header and if it is false then it sets X-E2ENCRYPT-SUPPORTED to false, "X-E2ENCRYPT: ENCRYPT_LOCATION=SENDER, ENCRYPT_LIB=(RSA|PUBLIC_KEY|PER_SESSION_ SYMMETRIC), ENCRYPT_STRATEGY="ASSYMETRIC_PUBLIC_KEY", ENCRYPT_CONTENT=BODY-ONLY". The recipient on receiving the email can check the X-E2ENCRYPT-SUP-PORTED header and if its set to false, it may not attempt decryption.

The sender's email server (MTA) can route the encrypted email to the recipient's email server (MTA) using standard pre-existing email delivery processes. By now the email content can be encrypted and the email can include additional headers that can allow the recipient to apply appropriate decryption policies.

In one example scenario, or use case, a sender can reside inside a Secure Email Cluster while recipient can use an email domain that does not comply with Secure Email Cluster. The sender can send an EHLO to outbound Mail-Server/MTA in his/her Secure Email Cluster (SEMC). The sender's MailServer/MTA's EHLO SMTP hook can respond with the following including the fact that the cluster supports End-to-End-Encrypted Email:

EHLO secure.mail.company.com
250-secure.mail.company.com says hello
250-ENHANCEDSTATUSCODES
250-PIPELINING
250-CHUNKING
250-E2ENCRYPT (RSA|PUBLIC_KEY)
250-E2ENCRYPT_PUBLICKEY_CACHE
250-E2ENCRYPT_DIGEST
250-CLUSTER-TYPE_END-TO-END-ENCRYPTION_ USER_POLICY_BACKED The server's EHLO SMTP hook can respond indicating that the server supports End-to-End-Encryption. Email clients supporting End-To-End Email Encryption can acknowledge the EHLO response and initialize corresponding encryption/decryption libraries depending on the sender's ENCRYPT_LOCATION policy. If the sender's ENCRYPT_ LOCATION policy is "SERVER" then no encryption libraries may be initialized in the client. If the sender's ENCRYPT_LOCATION policy is "CLIENT" then appropriate encryption libraries can be initialized by parsing the EHLO response line "250-E2ENCRYPT (RSA|PUB-LIC_KEY)"

Sender can send an RCPT_TO to outbound Mail-Server/ MTA in Secure Email Cluster (SEMC). Sender's Mail-Server/MTA's RCPT_TO SMTP hook, as part of his/her Secure Email Cluster (SEMC), can do the following: extract the domain from the recipient address, query the DNS to fetch the recipient domain's SRV record that holds the Query Public Key (QPK) service endpoint, since the recipient domain may not comply with being a Secure Email Cluster (SEMC) no such QPK is fetched.

In some examples, or use cases, no encryption is applied on the email as the recipient domain does not support end-to-end email encryption. The sender's email server (MTA) can route the encrypted email to the recipient's email server (MTA) using standard pre-existing email delivery processes.

In some examples, or use cases, sender can send an EHLO to outbound Mail-Server/MTA in his/her Secure Email Cluster (SEMC). The sender's MailServer/MTA's EHLO SMTP hook, can respond with the following including the fact that the cluster supports End-to-End-Encrypted Email:

EHLO secure.mail.company.com
    250-secure.mail.company.com says hello
    250-ENHANCEDSTATUSCODES
    250-PIPELINING
    250-CHUNKING
    250-E2ENCRYPT (RSA|PUBLIC_KEY)
    250-E2ENCRYPT_PUBLICKEY_CACHE
    250-E2ENCRYPT_DIGEST
    250-CLUSTER-TYPE_END-TO-END-ENCRYPTION The server's EHLO SMTP hook can respond saying that the server supports CLUSTER-TYPE_END-TO-END-ENCRYPTION. This can mean that that the Secure Email Cluster does encryption decryption strictly on their respective servers and that users are not allowed to set policies for encryption decryption location. The workflow can proceed assuming "ENCRYPT_LOCATION=REMOTE" and "DECRYPT_LOCATION=REMOTE". The users can set DIGITAL_SIGNING=TRUE.

In some examples, or use cases, a recipient can reside in a Secure Email Cluster. Once a message is received by the recipient's domain a decryption process can be initiated. The decryptor process can first check the following header "X-E2ENCRYPT-SUPPORTED: TRUE". If the value is set to TRUE, then it can check if X-E2ENCRYPT-DIGITAL-SIGNATURE header is present. If the message is digitally signed then the decryptor process can proceed to find out the message digest that the sender sent by doing the following: base64 decodes the header's value, fetches the sender's public key by querying DNS and sender's Query Public Key (QPK) Service Endpoint address using SRV records, and decrypts the encrypted digest using the sender's public key.

The decryptor process can read the header X-E2ENCRYPT. If the header includes ENCRYPT_STRATEGY=ASSYMETRIC_PUBLIC_KEY, then it can decrypt the message using the recipient's private key. Which parts of the message are to be decrypted can be read based on the value in the header X-E2ENCRYPT. Inside that header's value there is an attribute called ENCRYPT_CONTENT=BODY-ONLY, which can be used to decide whether to apply the decryption. Otherwise, if the header includes ENCRYPT_STRATEGY=PER_SESSION_SYMMETRIC_KEY then the recipient's email client can read the header X-E2ENCRYPT-PER_SESSION_SYMMETRIC_KEY.

The recipient's email client, base64 can decodes the header value and decrypt the key using the recipient's private key. The recipient's email client can decrypt the message using the symmetric key. Which parts of the message are to be decrypted can be read from the X-E2ENCRYPT header value ENCRYPT_CONTENT=BODY-ONLY.

Once the message has been decrypted, a message digest can be again computed by the decryption. If the message was digitally signed based on whether the header X-E2ENCRYPT-DIGITAL-SIGNATURE is present in the message, then the digest fetched in the previous step is compared with the digest that the decryption generates. If the digests match, then the message can be passed. Otherwise, the message can be flagged. If recipient policy DECRYPT_LOCATION=REMOTE, then the decryptor process can run on the recipient domain's MTA. If recipient policy DECRYPT_LOCATION=RECIPIENT, then the decryptor process can run on the recipient's email client.

Figure 4:
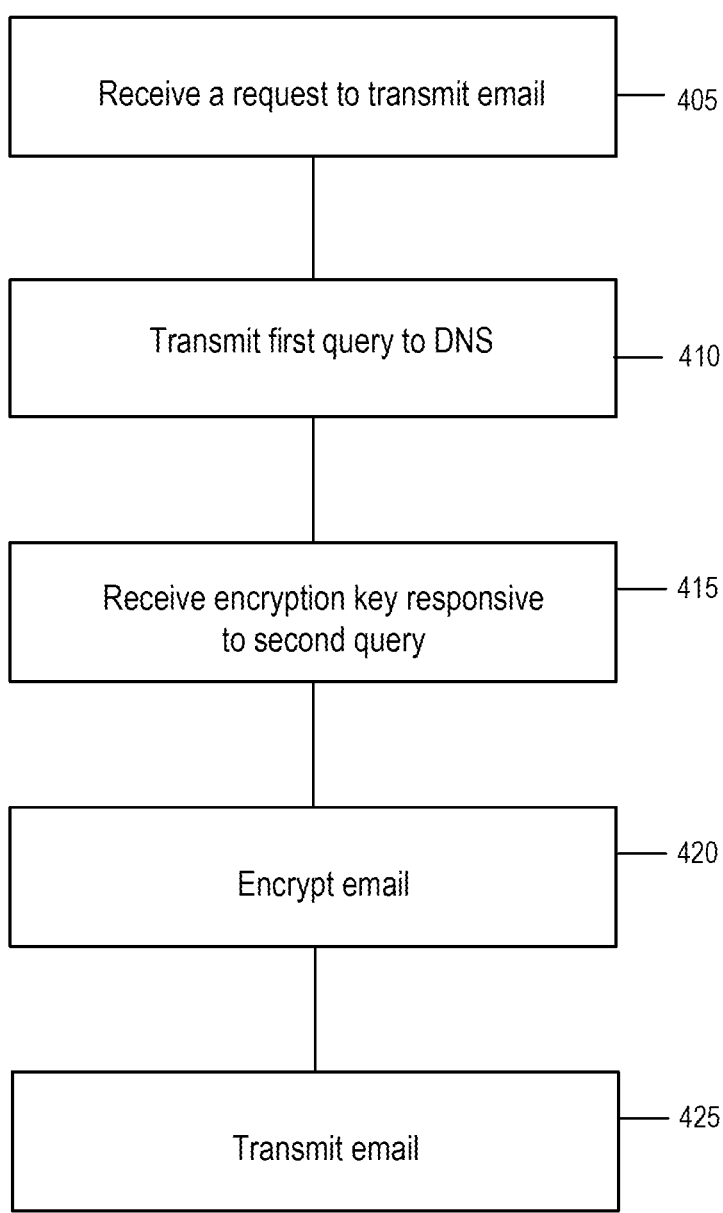
FIG. 4 illustrates a flow diagram of a method for providing a seamless end-to-end email encryption and delivery between secure email clusters without prior key sharing or protocol configurations.

FIG. 4 illustrates a flow diagram of a method 400 for providing a seamless end-to-end email encryption and delivery between secure email clusters without prior key sharing or protocol configurations. Method 400 can include acts 405-425 that can be performed by example system 100 whose components can utilize features of the computing system 200. At 405, a request to transmit an email can be received. At 410, a first query can be transmitted to a DNS. At 415, an encryption key can be received responsive to a second query. At 420, the email can be encrypted. At 425, the email can be transmitted.

At 405, an MTA of a first entity (e.g., secure email cluster of the sender) can receive a request to transmit an email. The method can include a mail transport agent (MTA) of a sender enterprise (e.g., first entity) receiving a request to transmit an email to a recipient. The MTA can include an SMTP server comprising or providing any number of SMTP functions. The recipient can be identified by a domain of the recipient, an email address of the recipient, or any other recipient information. The request can be received from a user device of the sender sending the email to the recipient.

The first request can be sent responsive to the user at the user device drafting, completing or sending the email. The first request can be sent to the MTA or UPS of the first entity. The first request can be sent responsive to the user device dispatching the email. The first request can initiate the MTA to trigger the RCPT_TO command of the SMTP protocol.

At 410, a configured RCPT_TO command (e.g., RCPT_TO hook) can send a first query to a DNS. The method can include the MTA of the sender transmitting a first query to a domain name service (DNS). The first query can be to fetch one or more records corresponding to the domain of the recipient. The one or more records can identify a key service. The MTA of the sender (e.g., first entity) can intercept a RCPT_TO command for the email. The intercepted RCPT_TO command can be configured (e.g., hooked, modified or designed) to transmit the first query to the DNS. The first query can include an SMTP query to request the DNS to provide to the MTA the service records. The service records can include the key service (KS) records. The service records can include the user provisioning service (UPS) records. The service records can include any of: a time-to-live (TTL) value, a class of the record, a type of the record, a priority of the recipient, a weight of the recipient and a port identifier.

The DNS of the sender can be configured to receive from a second DNS of the recipient a first record of the one or more records corresponding to the domain of a user. The user can be a sender or a recipient. The DNS of the sender can be configured to transmit to the second DNS of the recipient a second record of the one or more records corresponding to a second domain of the sender. The DNSs of the sender and the recipient entities (e.g., two separate secure email clusters) can exchange their service records in order to synchronize the service records that they can serve in response to the queries of the configured (e.g., hooked) RCPT_TO command.

The MTA of the sender can intercept a RCPT_TO command for the email. The intercepted RCPT_TO command can be configured to transmit both the first query to the DNS and the second query to the key service. For example, the RCPT_TO command can be configured to send the first query to the DNS to acquire or receive the service records (e.g., KS records or USP records) and then, based on the information for the user (e.g., domain of the user) in the service records, request the corresponding encryption key for encrypting the email.

The MTA can receive from the DNS, responsive to the first query, a first record of the one or more records identifying the key service or the UPS service. The service record of the key service can include, for example: "_qpk._tcp.qpk.semc.company.com 86400 IN SRV 5 5 5001 qpk.semc.company.com", which can indicate that the key service for the domain "semc.company.com" can be reached at the hostname "qpk.semc.company.com" using TCP on port 5001. The priority and weight values of the KS record can both be set to a value, such as "5", to provide or indicate the order of preference and load balancing among multiple KS servers or services. For example, a KS record can include or identify a time-to-live (TTL) value (e.g., a parameter to determine time for which data, such as a record, service or encryption key, can be in the network before being discarded), a class of the record (e.g., protocol family to which the record belongs), a type of the record (e.g., A vs AAAA record, mail exchange or canonical name), a priority of the recipient, a weight of the recipient and a port identifier.

The MTA can receive, responsive to the first query, a second record of the one or more records identifying a provisioning service (e.g., UPS). The UPS resource can include information or data indicating that the UPS service for the domain "semc.company.com" can be reached at the hostname "ups.semc.company.com" using TCP on port 5001. The priority and weight values of the UPS record can both be set to a value, such as "5", to provide or indicate the order of preference and load balancing among multiple UPS servers or services. For example, a UPS record can include or identify a time-to-live (TTL) value (e.g., a parameter to determine time for which data, such as a record, service or encryption key, can be in the network before being discarded), a class of the record (e.g., protocol family to which the record belongs), a type of the record (e.g., A vs AAAA record, mail exchange or canonical name), a priority of the recipient, a weight of the recipient and a port identifier.

At 415, an encryption key can be received responsive to a second query of the configured RCPT_TO command (e.g., RCPT_TO hook). The method can include the MTA of the sender receiving, from the key service responsive to a second query to the key service, a key for encrypting the email. The second query can be a query sent by the RCPT_TO hook to a key service identified by the RCPT_TO hook based on the contents of the service records received responsive to the first query.

The key can include a public key of the recipient that the sender (e.g., user device or the MTA of the sender) can use for encrypting the email directed to the recipient. The key can include a symmetric key which both the sender and the recipient can use to encrypt and decrypt the same email. The key can be an encryption key generated for a particular session of the sender and the recipient. For example, the key service can generate a key for a session established between the sender and the recipient, responsive to the second query.

At 420, depending on the configuration/policy, the sender or the MTA can encrypt the email. The method can include the one of the sender or the MTA encrypting at least a portion of the email based at least on the key. For example, the MTA, the RCPT_TO command or the UPS can identify a configuration (e.g., policy) for encrypting the email by the sender and decrypting the email by the recipient using the key. The configuration can correspond to, or identify, a symmetric encryption for the email. Responsive to this configuration, the sender can generate the key for a session between the sender and the recipient.

The MTA can identify a configuration (e.g., policy) for encrypting the email by the sender. The configuration can correspond to, or identify, an asymmetric encryption configuration. Responsive to this configuration, the MTA can transmit the second query to the key service requesting the key. The key can include the public key of the recipient, which the sender can use to encrypt the email.

The MTA can determine, according to a configuration (e.g., policy) of a provisioning service, that a location for encrypting the email is one of the sender or the MTA. The one of the sender or the MTA can encrypt, responsive to the determined location, the at least the portion of the email. For instance, the configuration can be a configuration for determining the location of the encryption. The configuration can identify the location of the sender (e.g., user device) or the MTA as the location of the encryption. According to the configuration, the one of the sender or the MTA can perform the encryption using the encryption key received responsive to the second query.

The MTA can determine, based on a configuration (e.g., policy) of a provisioning service, that a hash value is to be included in the email. The configuration can be a configuration for a hash value to be included in the email. Responsive to this configuration, the MTA can generate (e.g., using an encryption key) and insert into the header of the email to be transmitted, the hash value generated for the email.

At 425, the MTA can transmit the encrypted email to the MTA of the second entity (e.g., recipient secure email cluster). The method can include transmitting the encrypted email to the recipient. The method can include the MTA of the sender entity (e.g., the first entity) transmitting the email to the MTA of the recipient entity (e.g., the second entity). The MTA can transmit the email responsive to the encryption of the email being complete.

The MTA can identify a configuration (e.g., policy) for caching the key. For example, a configuration for caching encryption keys can identify the key as one of the keys stored in the cache. Responsive to the configuration for caching the key, the MTA can cache the key on a cache server. The cached encryption key can be cached for future use, as needed.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

What is claimed is:
1. A method comprising:
   receiving, by a mail transport agent (MTA) of a sender, a request to transmit an email to a recipient identified by a domain of the recipient;
   transmitting, by the MTA of the sender using a RCPT_TO command of a simple mail transfer protocol (SMTP), a first query to a domain name service (DNS) to fetch one or more records corresponding to the domain of the recipient, the one or more records identifying a key service;

receiving, by the MTA from the key service responsive to a second query transmitted to the key service using the RCPT_TO command, a key for encrypting the email;

identifying, by the MTA, a configuration for encrypting the email by the sender and decrypting the email by the recipient using the key;

generating, by the sender responsive to the configuration, the key for a session between the sender and the recipient;

encrypting, by at least one of the sender or the MTA, at least a portion of the email based at least on the key; and transmitting the encrypted email to the recipient.

2. The method of claim 1, further comprising:

intercepting, by the MTA of the sender, the RCPT_TO command for the email, and responsive to the intercepted RCTP_TO command transmit the first query to the DNS and the second query to the key service.

3. The method of claim 2, further comprising:

receiving, by the MTA from the DNS responsive to the first query, a first record of the one or more records identifying the key service; and receiving, by the MTA responsive to the first query, a second record of the one or more records identifying a provisioning service.

4. The method of claim 1, wherein a record of the one or more records comprises at least one of: a time-to-live (TTL) value, a class of the record, a type of the record, a priority of the recipient, a weight of the recipient and a port identifier.

5. The method of claim 1, further comprising:

identifying, by the MTA, a configuration for encrypting the email by the sender; and transmitting, by the MTA responsive to the configuration, the second query to the key service, the second query requesting the key.

6. The method of claim 1, further comprising:

identifying, by the MTA, a configuration for caching the key; and caching, by the MTA responsive to the configuration for caching the key, the key on a cache server.

7. The method of claim 1, further comprising determining, according to a configuration of a provisioning service, that a location for encrypting the email is one of the sender or the MTA; and encrypting, by the one of the sender or the MTA responsive to the determined location, the at least the portion of the email by one of the sender or the MTA.

8. The method of claim 1, further comprising:

determining, based on a configuration of a provisioning service, that a hash value is to be included in the email; and inserting, by the MTA responsive to the configuration, the hash value in a header of the email to be transmitted.

9. The method of claim 1, wherein the DNS corresponds to the sender and is configured to receive from a second DNS of the recipient a first record of the one or more records corresponding to the domain of the recipient and transmit to the second DNS a second record of the one or more records corresponding to a second domain of the sender.

10. A system comprising:

at least one processor coupled with memory and configured to:

receive a request to transmit an email to a recipient identified by a domain of the recipient;

transmit a first query to a domain name service (DNS) using a RCPT_TO command of a simple mail transfer protocol (SMTP) to fetch one or more records corresponding to the domain of the recipient, the one or more records identifying a key service;

identify a configuration for encrypting the email by a sender of the email;

transmit, responsive to the configuration, the second query to the key service, the second query requesting the key;

receive, from the key service responsive to the second query to the key service transmitted using the RCPT_TO command, a key for encrypting the email;

encrypt at least a portion of the email based at least on the key; and transmit the encrypted email to the recipient.

11. The system of claim 10, wherein the at least one processor is configured to intercept the RCPT_TO command for the email, and responsive to the intercepted RCPT_TO command transmit the first query to the DNS and the second query to the key service.

12. The system of claim 10, wherein the one or more records comprise at least one of: a time-to-live (TTL) value, a class of the record, a type of the record, a priority of the recipient, a weight of the recipient and a port identifier.

13. The system of claim 11, wherein the at least one processor is configured to:

receive, from the DNS responsive to the first query, a first record of the one or more records identifying the key service; and receive, responsive to the first query, a second record of the one or more records identifying a provisioning service.

14. The system of claim 10, wherein the at least one processor is configured to:

identify a configuration for encrypting the email by a sender of the email and decrypting the email by the recipient using the key; and generate, responsive to the configuration, the key for a session between the sender and the recipient.

15. The system of claim 10, wherein the at least one processor is configured to:

identify a configuration for caching the key; and cache, responsive to the configuration, the key on a cache server.

16. The system of claim 10, wherein the at least one processor is configured to:

determine, according to a configuration of a provisioning service, that a location for encrypting the email is one of the sender or the MTA; and encrypt, by one of a sender of the email or a mail transport agent (MTA) responsive to the determined location, the at least the portion of the email by one of the sender or the MTA.

17. The system of claim 10, wherein the at least one processor is configured to:

determine, based on a configuration of a provisioning service, that a hash value is to be included into the email; and insert, responsive to the configuration, the hash value in a header of the email to be transmitted.

18. A non-transitory computer-readable medium storing instructions that, when executed by at least one processor of a service, cause the at least one processor to:

receive a request to transmit an email to a recipient identified by a domain of the recipient;

transmit a first query to a domain name service (DNS) using a RCPT_TO command of a simple mail transfer protocol (SMTP) to fetch one or more records corresponding to the domain of the recipient, the one or more records identifying a key service;

receive, from the key service responsive to a second query transmitted to the key service using the RCPT_TO command, a key for encrypting the email;

encrypt at least a portion of the email based at least on the key; and transmit the encrypted email to the recipient; and wherein the DNS corresponds to the sender and is configured to receive from a second DNS of the recipient a first record of the one or more records corresponding to the domain of the recipient and transmit to the second DNS a second record of the one or more records corresponding to a second domain of the sender.

19. A system comprising:

at least one processor coupled with memory and configured to:

intercept a RCPT_TO command for an email to a recipient identified by a domain of the recipient;

responsive to the intercepted RCPT_TO command, transmit a first query to a domain name service (DNS) using a RCPT_TO command of a simple mail transfer protocol (SMTP) to fetch one or more records corresponding to the domain of the recipient, the one or more records identifying a key service;

receive, from the key service responsive to a second query, transmitted responsive to the intercepted RCPT_TO command, to the key service transmitted using the RCPT_TO command, a key for encrypting the email;

encrypt at least a portion of the email based at least on the key; and transmit the encrypted email to the recipient.

\* \* \* \* \*